United States Patent
Fusco et al.

(10) Patent No.: US 12,411,878 B2
(45) Date of Patent: Sep. 9, 2025

(54) DETERMINING SPECIFICITY OF TEXT TERMS IN APPLICATION CONTEXTS

(71) Applicant: International Business Machines Corporation, Armonk, NY (US)

(72) Inventors: Francesco Fusco, Zurich (CH); Diego Matteo Antognini, Ruvigliana (CH)

(73) Assignee: International Business Machines Corporation, Armonk, NY (US)

( * ) Notice: Subject to any disclaimer, the term of this patent is extended or adjusted under 35 U.S.C. 154(b) by 294 days.

(21) Appl. No.: 18/187,862

(22) Filed: Mar. 22, 2023

(65) Prior Publication Data

US 2024/0320249 A1      Sep. 26, 2024

(51) Int. Cl.
*G06F 16/334*   (2025.01)
*G06F 40/284*   (2020.01)
*G06F 40/30*   (2020.01)

(52) U.S. Cl.
CPC ........ *G06F 16/3346* (2019.01); *G06F 40/284* (2020.01); *G06F 40/30* (2020.01)

(58) Field of Classification Search
CPC ..... G06F 16/3346; G06F 40/284; G06F 40/30
See application file for complete search history.

(56) References Cited

U.S. PATENT DOCUMENTS

| | | |
|---|---|---|
| 8,250,092 B2 | 8/2012 | Gollapudi |
| 8,370,319 B1 | 2/2013 | Krynski |
| 8,583,640 B2 | 11/2013 | Zhang |
| 10,157,223 B2 | 12/2018 | Misra |
| 11,030,999 B1 | 6/2021 | Yu et al. |
| 11,361,571 B1 | 6/2022 | Fusco |
| 2009/0177463 A1* | 7/2009 | Gallagher ............ G06F 16/313 704/10 |
| 2013/0086509 A1 | 4/2013 | Satyanarayana |

(Continued)

FOREIGN PATENT DOCUMENTS

CN      107679244 A      2/2018

OTHER PUBLICATIONS

Tran, Hanh Thi Hong, et al. "The recent advances in automatic term extraction: A survey." arXiv preprint arXiv:2301.06767 (2023). (Year: 2023).*

(Continued)

*Primary Examiner* — Bhavesh M Mehta
*Assistant Examiner* — Edward Tracy, Jr.
(74) *Attorney, Agent, or Firm* — Anthony Curro

(57) ABSTRACT

A computer implemented method, a computer program product and a computer system and are provided to enrich downstream learning tasks. A processor stores selected text terms from a corpus of text. A processor determines an initial set of specificity scores for the selected text terms to produce a set of training samples, where each of the training samples comprise a selected text term and an initial specificity score for the selected text term. A processor trains a character-based regression model with the set of training samples. A processor retrieves an Automated Term Extraction (ATE) training data set. A processor determines specificity scores for text terms included in the ATE training data set. A processor, responsive to respective specificity score for a text term in the ATE training data set being below a threshold value, masks the text term from being used in the ATE training data set.

20 Claims, 10 Drawing Sheets

(56) References Cited

U.S. PATENT DOCUMENTS

| | | | |
|---|---|---|---|
| 2017/0060842 | A1* | 3/2017 | Dwarakanath .......... G06F 40/30 |
| 2018/0260383 | A1 | 9/2018 | Beller |
| 2018/0260472 | A1* | 9/2018 | Kelsey .................... G06F 40/56 |
| 2022/0101113 | A1 | 3/2022 | Tam et al. |
| 2022/0179906 | A1 | 6/2022 | Desai et al. |
| 2022/0279014 | A1 | 9/2022 | Stokes et al. |
| 2022/0382972 | A1 | 12/2022 | El-Kurdi et al. |
| 2022/0383096 | A1* | 12/2022 | Zhu .......................... G06N 3/08 |
| 2023/0017396 | A1* | 1/2023 | Weerasinghe ...... G06F 21/6227 |
| 2023/0055769 | A1 | 2/2023 | Fusco |
| 2024/0095268 | A1 | 3/2024 | Dhar et al. |
| 2024/0241902 | A1 | 7/2024 | Shalmashi et al. |
| 2024/0320429 | A1 | 9/2024 | Antognini et al. |

OTHER PUBLICATIONS

Bordea, Georgeta, "Domain adaptive extraction of topical hierarchies for Expertise Mining", NUI Galway, Sep. 11, 2013, 191 pages.

Chirkova et al., "CodeBPE: Investigating Subtokenization Options for Large Language Model Pretraining on Source Code", ICLR Workshop on Deep Learning for Code, 2022, 13 pages.

Constant et al., "Multiword Expression Processing: A Survey", Computational Linguistics, vol. 43, No. 4, © 2017 Association for Computational Linguistics, 56 pages.

Dowlagar et al., "Unsupervised Technical Domain Terms Extraction using Term Extractor", arXiv:2101.09015v1 [cs.CL] Jan. 22, 2021, 4 pages.

He, Tiantian, "Specificity Prediction for Sentences in Press Releases", Uppsala University, Jun. 17, 2020,31 pages.

Kim et al., "An Unsupervised Approach to Domain-Specific Term Extraction", printed on Dec. 20, 2022, 5 pages, <https://aclanthology.org/U09-1013.pdf>.

Korkontzelos, Ioannis, "Unsupervised Learning of Multiword Expressions", Ph.D, Thesis, The University of York, Sep. 20, 2010, 258 pages.

Qi et al., "Deep Learning for Character-based Information Extraction", printed on Dec. 20, 2022, 9 pages, <http://www.cs.cmu.edu/~qyj/zhSenna/2014_ecir2014_full.pdf>.

Riedl et al., "A Single Word is not Enough: Ranking Multiword Expressions Using Distributional Semantics", Proceedings of the 2015 Conference on Empirical Methods in Natural Language Processing, Lisbon, Portugal, Sep. 17-21, 2015, © 2015 Association for Computational Linguistics, 11 pages.

Ryu et al., "Determining the Specificity of Terms based on Information Theoretic Measures", CompuTerm 2004 Poster Session—3rd International Workshop on Computational Terminology, 5 pages.

Sachidananda et al., "Efficient Domain Adaptation of Language Models via Adaptive Tokenization", Proceedings of the 2nd Workshop on Simple and Efficient Natural Language Processing, Nov. 10, 2021, © 201 Association for Computational Linguistics, 11 pages.

Zhang et al., "Improving Domain-specific Entity Recognition with Automatic Term Recognition and Feature Extraction", 2010, 8 pages., <http://lrec.elra.info/proceedings/lrec2010/pdf/214_Paper.pdf>.

Antognini et al., "Domain-Specificity Prediction for Natural Language Processing", U.S. Appl. No. 18/187,875, filed Mar. 22, 2023, 33 pages.

BM Appendix P, list of patents and patent applications treated as related, Filed Herewith, 2 pages.

"SimGet is a service to train and query word embeddings (word2vec and Glove)", zrl-cogsys/simget, Jan. 15, 2025, 6 pages.

Baeza-Yates, "Semantic query understanding," in Proceedings of the 40th International ACM SIGIR Conference on Research and Development in Information Retrieval, ser. SIGIR '17. New York, NY, USA: Association for Computing Machinery, Aug. 2017, p. 1357.

Beltagy et al., "Scibert: Pretrained contextualized embeddings for scientific text," arXiv:1903.10676, Sep. 2019, 6 pages.

Bostrom et al., "Byte pair encoding is suboptimal for language model pretraining," in Findings of the Association for Computational Linguistics: EMNLP 2020. Online: Association for Computational Linguistics, Nov. 2020, pp. 4617-4624.

Chirkova et al., "CodeBPE: Investigating subtokenization options for large language model pretraining on source code," in Deep Learning for Code, 2022, 13 pages.

Eigenmann et al., "Evaluating Text Classification Models on Multilingual Documents", 2021, Master Thesis, Department of Informatics, University of Fribourg, pp. 1-42 (Year: 2021).

Fix et al., "Discriminatory analysis. nonparametric discrimination: Consistency properties," International Statistical Review, vol. 57, No. 3, Dec. 1989, 138 pages.

Kudo, "Subword regularization: Improving neural network translation models with multiple subword candidates," in Proceedings of the 56th Annual Meeting of the Association for Computational Linguistics (vol. 1: Long Papers). Melbourne, Australia: Association for Computational Linguistics, Jul. 2018, pp. 66-75.

Lo et al., "S2ORC: The Semantic Scholar Open Research Corpus", Proceedings of the 58th Annual Meeting of the Association for Computational Linguistics, Jul. 5-10, 2020, pp. 4969-4983.

Sachidananda et al., "Efficient domain adaptation of language models via adaptive tokenization," in Proceedings of the Second Workshop on Simple and Efficient Natural Language Processing. Virtual: Association for Computational Linguistics, Nov. 2021, pp. 155-165.

Schuster et al., "Japanese and korean voice search," in International Conference on Acoustics, Speech and Signal Processing, 2012, pp. 5149-5152.

Sennrich et al., "Neural Machine Translation of Rare Words with Subword Units", Proceedings of the 54th Annual Meeting of the Association for Computational Linguistics, Aug. 2016, pp. 1715-1725.

Staar et al., "IBM Research's open-source toolkit for Deep Search", Retrieved from: https://research.ibm.com/blog/deep-search-toolkit, Jul. 2022, 6 pages.

Unknown, "Deep Search", Retrieved from: https://ds4sd.github.io/, 2023, 11 pages.

Unknown, "Expanding Concept Understanding in Microsoft Academic Graph", Retrieved from: https://www.microsoft.com/en-us/research/articles/expanding-concept-understanding-in-microsoft-academic-graph/, Feb. 26, 2020, 6 pages.

Unknown, "Inside-outside-beginning (tagging)", Retrieved from: https://en.wikipedia.org/wiki/Inside%E2%80%93outside%E2%80%93beginning_(tagging), Sep. 2013, 3 pages.

Zheng et al., "A survey of query result diversification," Knowl. Inf. Syst., vol. 51, No. 1, Apr. 2017, 46 pages.

\* cited by examiner

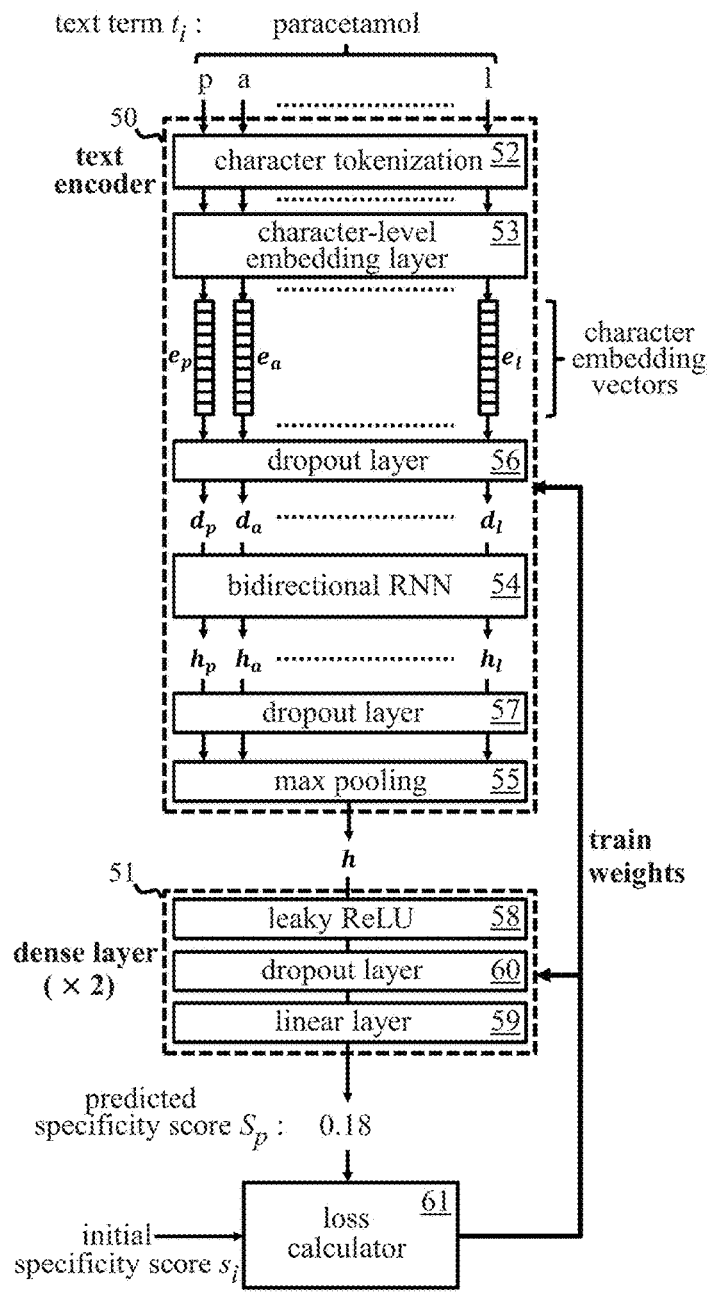
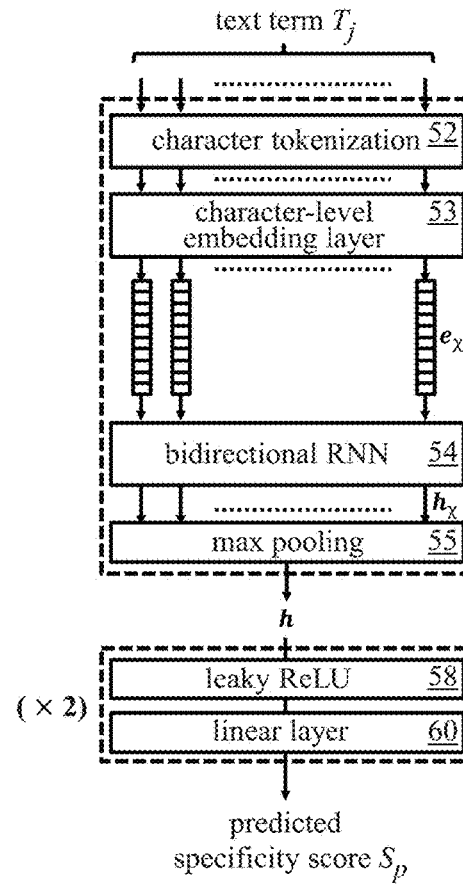
FIG. 4A
FIG. 4B

Generated Training samples

| #term | score |
|---|---|
| ... | |
| machine_learning | 0.3734 |
| information_retrieval | 0.1870 |
| information_retrieval | 0.1695 |
| ... | |
| machine_learning | 0.1556 |
| machine_learning | 0.1952 |
| deep_learning | 0.2481 |
| ... | |
| machine_learning | 0.3223 |
| information_retrieval | 0.1505 |
| information_retrieval | 0.1447 |
| deep_learning | 0.3072 |
| deep_learning | 0.4358 |
| ... | |

FIG. 7

Ranking of Predicted Specificity Scores for Generalized Domain

| Top 10 MWE | Specificity Score |
|---|---|
| user_equipment_category | 0.333821322882244 |
| isomorphism_closed_subcategory | 0.3272699985242191 |
| semiadditive_category | 0.3261759005763309 |
| graded_category | 0.3260855071855317 |
| homotopy_category | 0.325485278174664 |
| monoidal_closed_category | 0.3222616133153124 |
| blue_skinned_humanoid | 0.3213510055027662 |
| top_nacional_category | 0.3209140759539686 |
| homopantothenic_acid | 0.3206908803105186 |
| transmit_receive_module | 0.3196543131094849 |

| Bottom 10 MWE | Specificity Score |
|---|---|
| small_role | -0.007113824078786024 |
| new_report | -0.008706775272159462 |
| new_creature | -0.009599135446936913 |
| estimated_time | -0.010618722207269116 |
| new_one | -0.014106301975832736 |
| important_role | -0.015355893245602 |
| crucial_role | -0.01791608871870301 |
| new_port | -0.026565552500922962 |
| new_feature | -0.027260736812031894 |
| specific_role | -0.034924237796104 |

FIG. 8

ATE Training Samples

In computer science and information theory, a Huffman code is a particular type of optimal prefix code that is commonly used for lossless data compression. ✓

From 2004 to 2008, new research emerged on ways to further compress the data contained in images without modifying the image. ✗

JPEG is a commonly used method of lossy compression for digital images, particularly for those images produced by digital photography. ✓

FIG. 9

Training Sample

In computer science and information theory, a Huffman code is a particul~~ar type~~ of optimal prefix code that is commonly used for lossless data compression.

Curated Sample

In computer science and information theory, a Huffman code is a particular type of optimal prefix code that is commonly used for lossless data compression.

FIG. 10

DETERMINING SPECIFICITY OF TEXT TERMS IN APPLICATION CONTEXTS

BACKGROUND OF THE INVENTION

The present invention relates generally to determining specificity of text terms for use in text processing applications. Computer-implemented methods are provided for determining specificity of text terms, together with systems, computer program products and text processing applications implementing such methods.

The specificity of a text term, such as singular words or multiword expressions, is a measure of the quantity of information contained in that term. When a text term contains a lot of information in a given domain, that term is highly specific to the domain, and vice versa. Capturing the specificity of text terms can be extremely valuable for numerous processing applications relating to information retrieval, learning and knowledge discovery. In our modern world, huge quantities of data are being generated at ever increasing rates. Text documents such as research papers, scientific journals, news reports, etc., provide vast repositories of information covering a diverse spectrum of domains. Processing such text to allow this information to be identified, extracted and ultimately made useful presents an enormous challenge. The ability to process text terms based on specificity of the concepts they represent can be invaluable in this and other technical applications.

SUMMARY

Embodiments of the present invention provide a method, system, and program product to enrich downstream learning tasks. A processor stores selected text terms from a corpus of text. A processor determines an initial set of specificity scores for the selected text terms to produce a set of training samples, where each of the training samples comprise a selected text term and an initial specificity score for the selected text term. A processor trains a character-based regression model with the set of training samples. A processor retrieves an Automated Term Extraction (ATE) training data set. A processor determines specificity scores for text terms included in the ATE training data set. A processor, responsive to respective specificity score for a text term in the ATE training data set being below a threshold value, masks the text term from being used in the ATE training data set.

BRIEF DESCRIPTION OF THE SEVERAL VIEWS OF THE DRAWINGS

FIGS. 4a and 4b illustrate training and inference architectures for a character-based regression model in the FIG. 2 system;

FIGS. 7 and 8 illustrate results of steps of the FIG. 6 method in an exemplary implementation;

FIGS. 9 and 10 illustrate application of the FIG. 6 method for curating training datasets for Automated Term Extraction systems;

DETAILED DESCRIPTION

Figure 1:
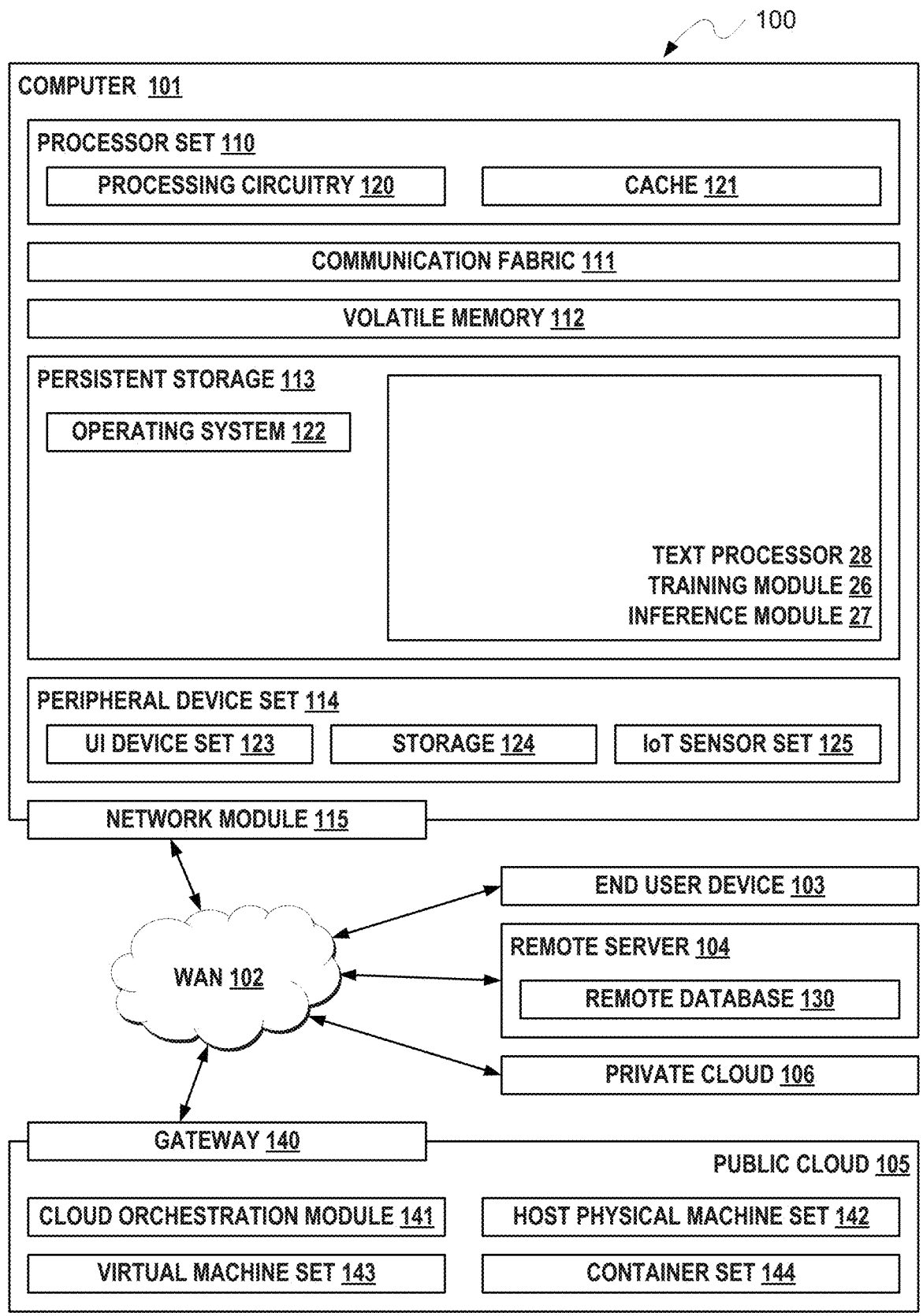
FIG. 1 is a schematic representation of a computing system for implementing methods embodying the invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as text processor 28, training module 26 and inference module 27, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods (i.e., text processor 28, training module 26 and inference module 27) may be stored in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGs. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the FIGs. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
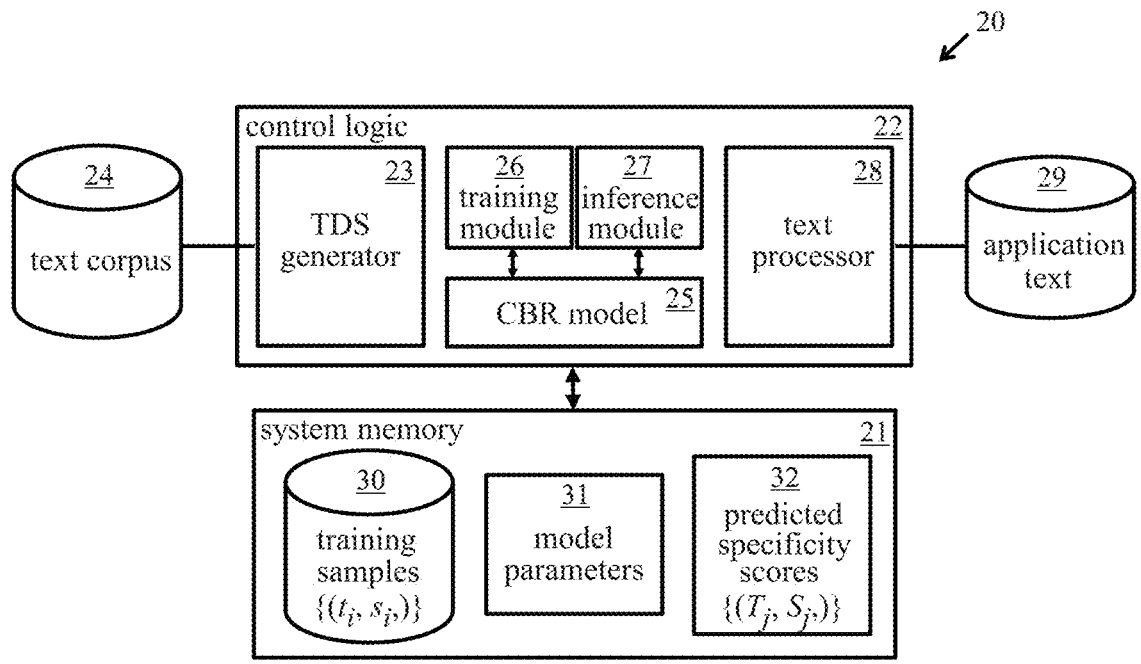
FIG. 2 illustrates component modules of a first computing system for determining specificity of text terms.

The FIG. 2 schematic illustrates component modules of a first computing system embodying the invention. The system 20 comprises memory 21 and control logic, indicated generally at 22, comprising functionality for determining specificity of text terms. The control logic 22 comprises a training dataset (TDS) generator 23 which obtains selected text terms from a corpus of text 24, and a character-based regression (CBR) model 25 with associated training and inference modules 26 and 27. The control logic 22 further comprises a text processor module 28 which receives further text terms from an application text-set 29 to be processed. Logic modules 23 through 28 interface with memory 21 which stores various data structures used in operation of system 20. These data structures include a dataset of training samples 30 for training of CBR model 25, the model parameters 31 for the trained CBR model, and a set 32 of predicted specificity scores for further text terms to which the CBR model is applied for inference.

In general, functionality of logic modules 23 through 28 may be implemented by software (e.g., program modules) or hardware or a combination thereof. Functionality described may be allocated differently between system modules in other embodiments, and functionality of one or more modules may be combined. The component modules of computing system 20 may be provided in one or more computers of a computing system. For example, all modules may be provided in a user computer 1, or modules may be provided in one or more computers/servers which communicate via a network (comprising one or more component networks and/or internetworks, including the Internet). System memory 21 may be implemented by one or memory/storage components associated with one or more computers of system 20.

Figure 3:
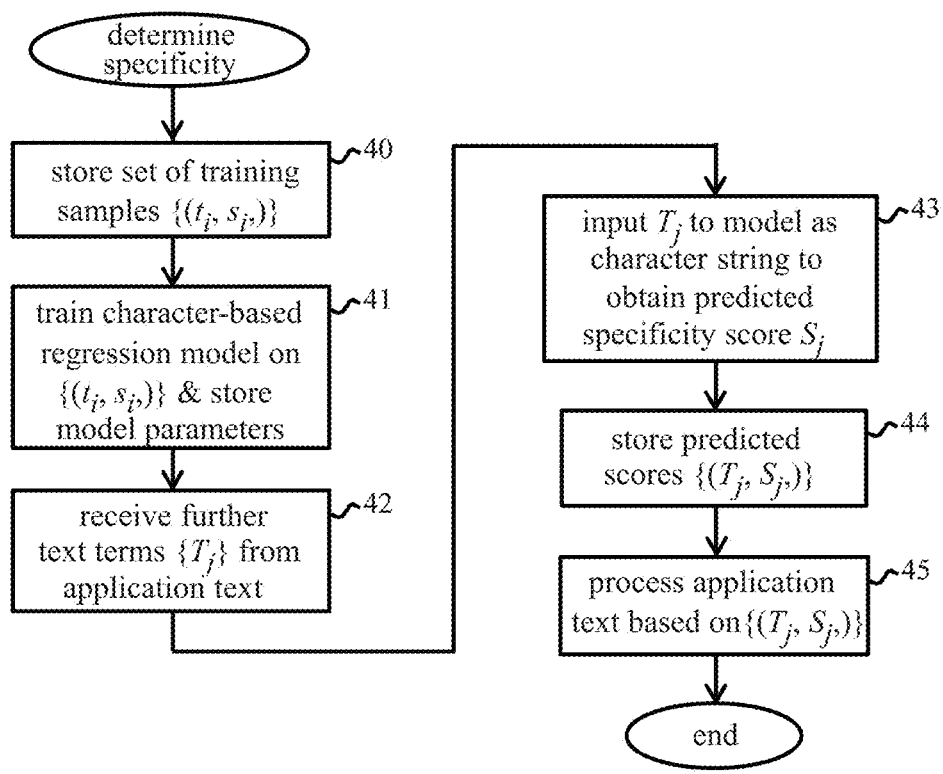
FIG. 3 indicates steps of a method performed by the FIG. 2 system.

FIG. 3 indicates basic steps of a method for determining specificity of text terms as implemented by system 20. Step 40 represents storage by TDS generator 23 of the training dataset 30 in system memory 21. This training dataset comprises a set of N training samples, denoted by $\{(t_i, s_i)\}$, i=1 to N, each comprising a selected text term $t_i$ contained in text corpus 24 and an initial specificity score $s_i$ for that term. A text term $t_i$ may be a single word or a multiword expression. Multiword expressions (MWEs) are sequences of two or more words, such as "machine learning" or "information retrieval", which act as a single unit because they are semantically or syntactically related. The text terms $t_i$ may be selected from text corpus 24 using various techniques described below. The initial specificity scores $s_i$ for text terms can be calculated using text corpus 24, again using various techniques, as described further below.

In step 41, the training samples $\{(t_i, s_i)\}$ are supplied to training module 26 which uses the samples to train CBR model 25 to output a predicted specificity score for a text term which is input to the model as a character string. The architecture and operation of CBR model 25 is described further below. The parameters of the trained model are then stored at 31 in system memory 21. After training the CBR model, in step 42 the text processor 28 receives further text terms, denoted by $\{T_j\}$, from the application text-set 29 which is to be processed in dependence on specificity of text terms contained therein. In step 43, the CBR model 25 is used to determine specificity of the further terms $\{T_j\}$. Here, each text term $T_j$ is supplied to inference module 27 which inputs $T_j$ as a character string to the model to obtain a predicted specificity score, denoted by $S_j$, for that term. As indicated at step 44, the resulting predicted specificity scores $\{(T_j, S_j)\}$ are stored at 32 in system memory. In this example, in step 45, the text processor 28 then processes application text-set 29 in dependence on the predicted specificity scores $\{(T_j, S_j)\}$. A variety of processing operations may be performed here depending on the application in question, and particular examples are described below.

FIGS. 4a and 4b are schematic representations of an exemplary implementation of CBR model 25. This model comprises a series of neural network (NN) layers in which weighted signals are processed and propagated from the model input to the model output. FIG. 4a shows the model architecture for the training operation (step 41 of FIG. 3). The model comprises a text encoder 50 followed by two successive dense layers 51 (only one of which is shown in the FIG. 4a for simplicity). Text encoder 50 comprise a character tokenization layer 52, a character-level embedding layer 53, a bidirectional recurrent neural network (RNN) 54, here based on gated recurrent units (GRUs), and a max pooling layer 55. In this example, dropout layers 56 and 57 are included at the input and output respectively of RNN 54. Each dense layer 51 comprises a leaky ReLU activation layer 58 and a linear NN layer 59, here with an intervening dropout layer 60.

During training, a text term $t_i$ from training dataset 30 is input to text encoder 50 as a character string. In this example, as illustrated for the term "paracetamol", successive characters of the character string comprise successive letters of the text term. For a multiword expression such as "machine_learning", the space "_" is deemed a letter for this purpose. The characters of the text term are input in parallel to tokenization layer 52. (The number of character inputs to tokenization layer 52 is determined based on the longest character string in training dataset 30, with no input being supplied to the "spare" character inputs for shorter strings $t_i$). Tokenization layer 52 encodes the input characters into respective tokens. One-hot encoding is conveniently employed here, though other encoding schemes can be envisaged. The character tokens are input in parallel to character embedding layer 53 which encodes each character into a respective embedding vector, denoted here by $e_\chi$ (where $\chi$ denotes the corresponding character) of dimension L. In this example, L=32. Dropout layer 56 operates in the usual way for regularization, setting a small proportion of randomly-selected values in each embedding vector to zero. This makes the trained model better able to generalize, and thus more robust. The modified embedding vectors, denoted here by $d_\chi$, from dropout layer 56 are then input to bidirectional RNN 54. This comprises two parallel RNN layers each of which receives the input vectors $d_\chi$ in a different order, one from first to last (i.e. $d_p$ to $d_l$) and the other from last to first ($d_l$ to $d_p$). The resulting output vectors from these layers, here of dimension M=256, are aggregated for each character to obtain a set of output vectors $h_\chi$ as indicated. After further dropout layer 57, the resulting vectors are aggregated in max pooling layer 55 to obtain a single vector h of dimension M. The vector h is then propagated through successive dense layers 51 which yield a single output value, denoted by $S_p$, which represents a predicted specificity score for the input term $t_i$. The score $S_p$ is supplied, along with the initial specificity score $s_i$ from the training sample ($t_i$, $s_i$) for term $t_i$, to a loss calculator 61 which evaluates a loss function dependent on the difference between $S_p$ and $s_i$ to calculate the network error (loss) for the current sample. Errors are then backpropagated through the network and the model parameters (NN weights) are then incrementally updated to move towards a more optimal weight-set. The weight updates can be calculated by a well-known gradient-descent technique with an optional L2-norm penalty.

The above training process iterates for successive training samples in dataset 30 until a predefined convergence condition is achieved. Convergence can be defined in various ways, e.g., as the point at which the network loss cannot be reduced any further, and the particular convergence condition is orthogonal to the operation described.

When applied for inference (step 43 of FIG. 3), the model 25 operates with fixed weights as optimized by the training process. The model architecture for inference is shown in FIG. 4b. This corresponds to the FIG. 4a architecture with the dropout layers 56, 57 and 60 disabled (i.e., all vector elements are passed without dropouts). A new text term $T_j$ is input as a character string as before, and the model then outputs the predicted specificity score $S_j$ for that term.

It will be seen that, after training CBR model 25, the model can be used to predict specificity scores for arbitrary text terms based solely on character-level information (morphology signals). The model can thus be applied to previously unseen text and can generalize to arbitrary domains. The trained CBR model provides a computationally efficient system for computing specificity of text terms. Specificity scores can be computed in milliseconds with models that are less than a megabyte in size. Compared to prior techniques for estimating specificity (such as techniques discussed below for providing initial specificity scores $s_i$), this represents a huge saving in compute resources and storage requirements. Prior techniques can be leveraged to provide inputs for the model training process, but the resulting character-based model then provides a robust standalone system, which is computationally-lightweight and has a small memory footprint, enabling specificity scores to be generated for arbitrary text. This is extremely valuable for numerous processing applications in term extraction and knowledge discovery generally.

In general, the text corpus 24 containing text terms $t_i$ may be local or remote from system 20. While indicated as a single entity in FIG. 2, this text corpus may comprise one or more text-sets of one or more types, including sets of document such as research papers, abstracts, scientific articles, news reports, etc., as well as text content of webpages, knowledge bases, knowledge graphs and other text data structures. Text terms can be selected from such text-sets in various ways. For example, well-known Automated Term Extraction (ATE) techniques can be applied to extract text terms from domain specific corpora. Multiword expressions (MWEs) can be identified using any of a variety of ATE systems known in the art. Alternatively, or in addition, MWEs can be extracted in a semi-automated way from terms associated with hyperlinks in knowledge bases such as Wikipedia or captions of hyperlinks in other web pages. Terms may also be extracted from pre-compiled dictionaries of terms such as manually curated glossaries for specific domains. The text terms $t_i$ can thus be selected from a corpus 24 comprising various text-sets spanning a diverse range of domains. In some embodiments of the present invention, TDS generator 23 can select text terms $t_i$ via ATE processing of text corpus 24, and can calculate the initial specificity scores $s_i$ from the text corpus using automated text processing techniques described below. In other embodiments, TDS generator 23 may generate training dataset 30 by compiling precomputed results for specificity scores $s_i$ derived for terms $t_i$ from one or more text-sets using any automated or semi-automated processing technique known in the art.

Figure 5:
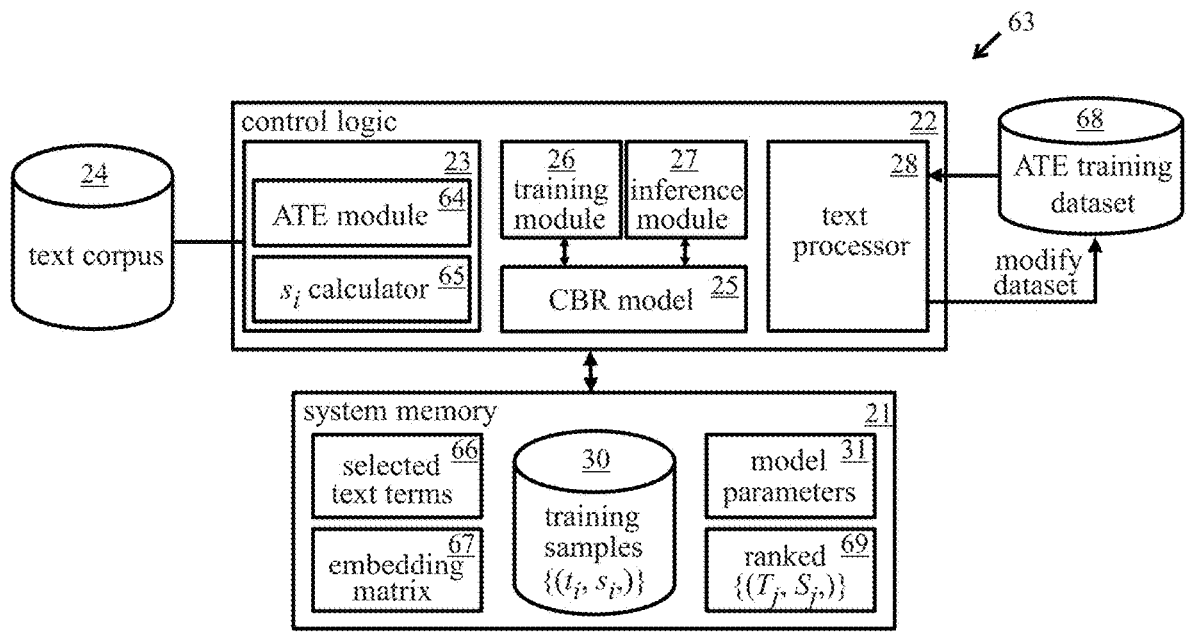
FIG. 5 illustrates component modules of a second computing for determining specificity of text terms.

FIG. 5 shows a more detailed system implementation according to some embodiments of the present invention. Components corresponding to those of FIG. 2 are indicated by like reference numerals in this FIG. 5. In the system 63 of this example, the TDS generator 23 comprises an ATE module 64 and an initial specificity score calculator 65. Memory 21 stores a set 66 of text terms selected by ATE module 64 from text corpus 24, and an embedding matrix 67 which is used by $s_i$ calculator 65 to calculate initial specificity scores for these text terms. The text processor 28 of this example is adapted to process a training dataset 68 of text samples for ATE model to produce a modified training dataset. This processing operation exploits a ranked set 69 of predicted specificity scores $S_j$, generated by CBR model 25, for text terms $T_j$ in dataset 68.

Figure 6:
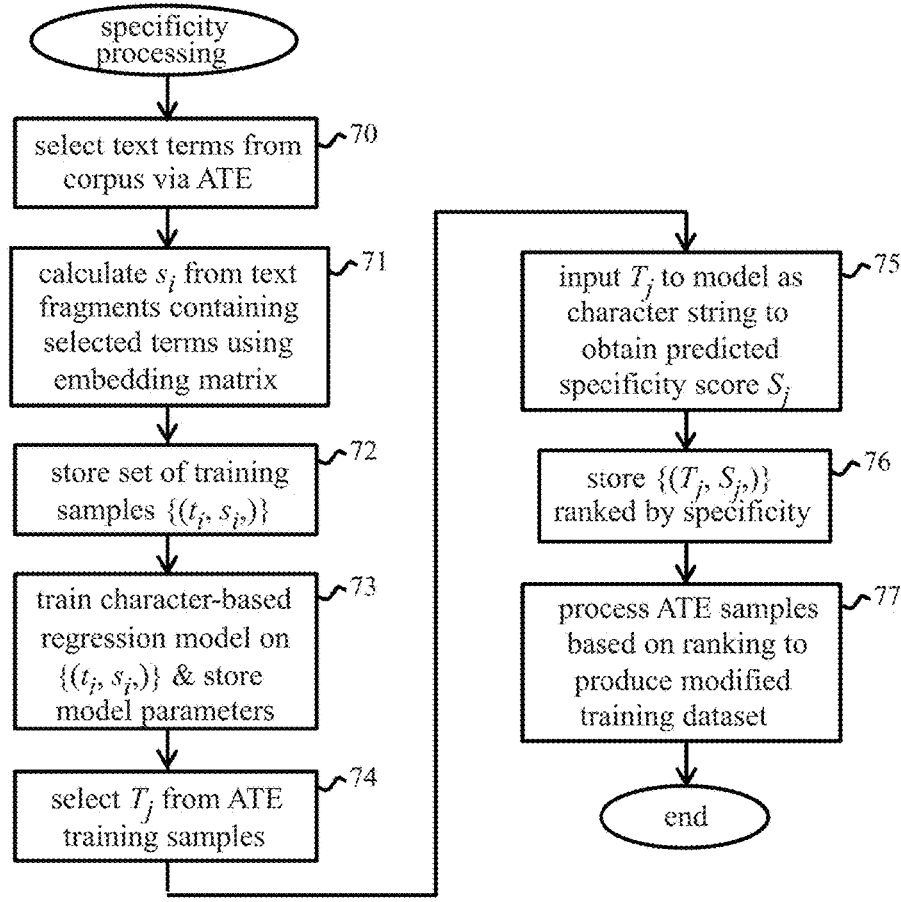
FIG. 6 indicates steps of a method performed by the FIG. 5 system.

Operation of system 63 is illustrated in FIG. 6. In step 70, ATE module 64 processes text corpus 24 to select a large set of text terms, including single words and MWEs, which are stored as set 66 in system memory 21. In this example, module 64 employs an ATE technique where, for example, approximately 500,000 distinct terms were extracted from about 1.7 million arXiv abstracts represented in corpus 24. In step 71, the $s_i$ calculator 65 uses an embedding-based technique to calculate initial specificity scores for the selected text terms 66. This process uses embedding matrix 67 which is precalculated using text corpus 24. This embedding matrix can be generated using a word embedding scheme. Word embedding schemes are well-known, and essentially generate a mapping between text terms and vectors of real numbers which define locations of respective terms in a multidimensional embedding space. The relative locations of text terms in this space are indicative of the degree of relationship between the text terms, with terms which are "closer" in the embedding space being more closely related than those which are further apart. Given a large corpus of text 24, the text is pre-processed such that multiword expressions are treated as single words through concatenation (e.g., the consecutive words "machine" and "learning" become the single text term "machine_learning"). Once the corpus is preprocessed, any desired word embedding scheme, such as the Word2vec, Glove, or FastText algorithms, can be used to create the embedding matrix. In this example, the embedding matrix was generated via a Word2vec implementation using the CBOW (Continuous Bag-Of-Words) algorithm.

The initial specificity scores are calculated in step 71 using text fragments in corpus 24 which contain instances of the selected text terms 66. In particular, an initial specificity score is calculated for a selected text term in dependence on distance in the word embedding space between the selected text term and other text terms contained in a text fragment ("context fragment") which includes an instance of the selected text term. The score is computed as an average of the pairwise distances in the embedding space between the selected term and all the other words/MWEs within a context fragment. The context fragment can be a window of words around the selected term, or the sentence (or paragraph) where the selected term appears. Common stopwords (such as "the", "in", "a", etc.), as well as numbers and units, can be removed from the fragment before processing. The remaining words/MWE constitute the set of all the distinct terms within the context. The resulting initial specificity score $s_i$ is then calculated as the average distance in the embedding space between the selected text term and each remaining term in the context fragment, where distance can be computed as the cosine similarity between the corresponding pair of embedding vectors in embedding matrix 67. Using cosine similarity here yields initial specificity scores $s_i$ in the range $-1 \leq s_i \leq +1$.

The specificity scores calculated in step 71 yield a set $\{(t_i, s_i)\}$ of term-score pairs which are stored in step 72 as training dataset 30. Note that, for selected text terms which appear in more than one context fragment, a plurality of initial specificity scores $s_i$ will be calculated for respective instances of that term, producing a plurality of training samples containing the same text term. In the exemplary implementation mentioned above, approximately 10 million training pairs $(t_i, s_i)$ were generated for the selected terms 66 from the arXiv abstracts. An illustrative excerpt from the resulting training data is shown in FIG. 7.

Step 73 of FIG. 5 represents training of CBR model 25 in the architecture of FIG. 4a. The resulting trained model can then be applied for inference without requiring further processing by ATE module 64 or specificity calculator 65. For an implementation using arXiv abstracts, the resulting trained model was tested for generalization to other domains. The model was used to predict specificity scores for MWEs extracted from Wikipedia hyperlinks. FIG. 8 shows the resulting scores for the ten highest- and lowest-ranked terms ordered by predicted specificity score. A clear difference can be observed between the top and bottom of the specificity distribution. The bottom of the distribution reflects irrelevant MWEs, while the top represents highly specific terms.

In step 74 of FIG. 6, the text processor 28 extracts further text terms $\{T_j\}$ from annotated text samples in ATE training dataset 68. Such samples are generally text fragments, typically sentences, with terms expressed in IOB (Inside, Outside, Beginning) format. In step 75, each text term $T_j$ is input to CBR model 25 (FIG. 4b architecture) as a character string to obtain a predicted specificity score $S_j$ for that term. Text processor 28 ranks the terms $T_j$ by specificity based on the predicted specificity scores $S_j$, and the resulting ranked pairs $\{(T_j, S_j)\}$ are stored at 69 in memory 21. In process 76, the resulting predicted specificity scores $\{(T_j, S_j)\}$ are stored at 32 in system memory and then ranked by specificity. In step 77, text processor 28 then processes training dataset 68 based on the specificity ranking $\{(T_j, S_j)\}$ to produce a modified training set with enhanced specificity. FIG. 9 illustrates one example of this process. This shows exemplary text samples as sentences in which the annotated terms (i.e., words/MWE which are tagged as terms to be identified by an ATE model) are indicated by bold type. Text processor 28 used the specificity ranking 69 to filter sentences from the training set to provide a modified training dataset comprising a higher proportion of text terms higher in the ranking. Samples can be filtered from the training set with a probability which is higher for samples containing terms lower in the ranking. For example, samples contain only terms with less than a threshold specificity can be removed from the dataset, e.g. the sample marked with a cross in FIG. 9. The resulting modified dataset then contains a higher proportion of samples containing more specific terms, e.g. those marked with a checkmark in FIG. 9. This sample selection operation produces a training dataset with fewer training samples that are borderline, improving accuracy of the trained ATE system.

Another example of text processing step 77 is illustrated in FIG. 10. Here, for each training sample containing a number of tagged terms, text processor 28 may "untag", or mask, certain terms (i.e. mark those terms as "non-terms") as indicated schematically for the term "particular type" in FIG. 10. Terms can be untagged with a probability which is higher for terms lower in the specificity ranking. For example, tagged terms having less than a threshold specificity score may be untagged. The final modified training set then comprises a higher proportion of tagged text terms higher in the specificity ranking. This term masking operation produces a modified training dataset which is biased for improved precision (rather than recall) which is extremely important for knowledge discovery tasks.

Curating ATE training sets as described above can reduce training complexity for ATE models, reducing compute resources required for the (computationally expensive) training operation, allowing improved ATE models to be obtained with smaller training sets.

It will be seen that system 63 can generate a training dataset for CBR model 25 in a totally unsupervised manner. Once the CBR model is trained, text corpus 24 and embedding matrix 67 are no longer required, and the inference latency for computing specificity scores is extremely low. Specificity scores can be predicted for terms which have not been seen in the training data using only morphology signals at the character level. The use of instance-based initial specificity scores (as opposed to averaging these scores for a given term) also enables model predictions to be influenced by scores for terms which are morphologically similar, improving the inference operation for unseen text.

While the embedding-based method for computing initial specificity scores provides a particularly high-quality specificity metric, various other methods might be used. For example, an initial specificity score may be calculated based on relationships, defined in a predetermined knowledge data structure, between the selected term and other terms in a context fragment. Two such methods are illustrated in FIGS. 11a and 11b.

Figure 11A:
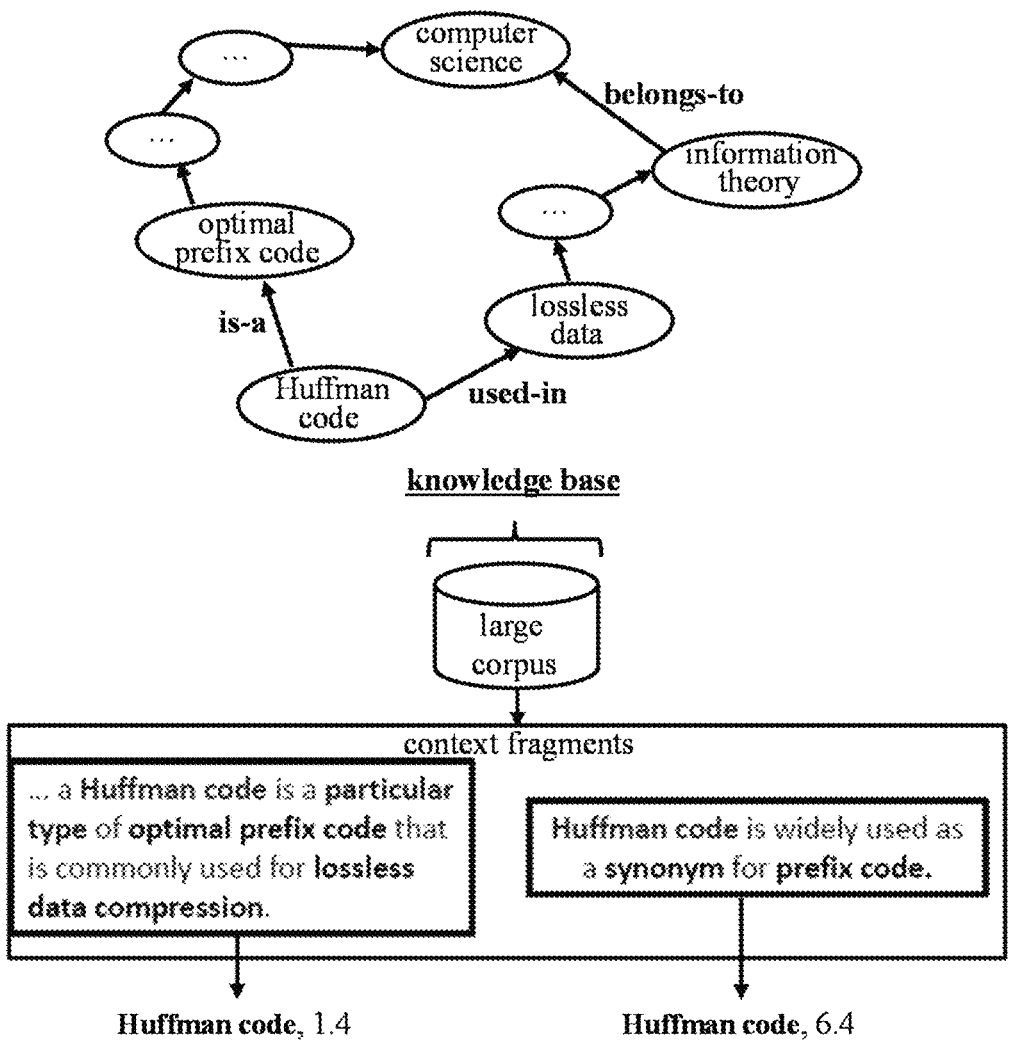
FIGS. 11a and 11b illustrate modifications to the FIG. 5 system.

FIG. 11a indicates how initial specificity scores $s_i$ can be calculated from a knowledge base in which text terms are linked according to particular relations (indicated by labelled arrows in FIG. 11a) between terms. Two context fragments containing a selected text term, here "Huffman code" are shown in FIG. 11a. A score $s_i$ can be calculated from each fragment in dependence on distance (in terms of number of hops) in the knowledge base between "Huffman code" and other text terms, indicated by bold type, in the fragment. For example, the score s; may be calculated as the average of these pairwise distances. If a term is not present in the knowledge base (e.g., "particular type" here), it is not included in the calculation.

Figure 11B:
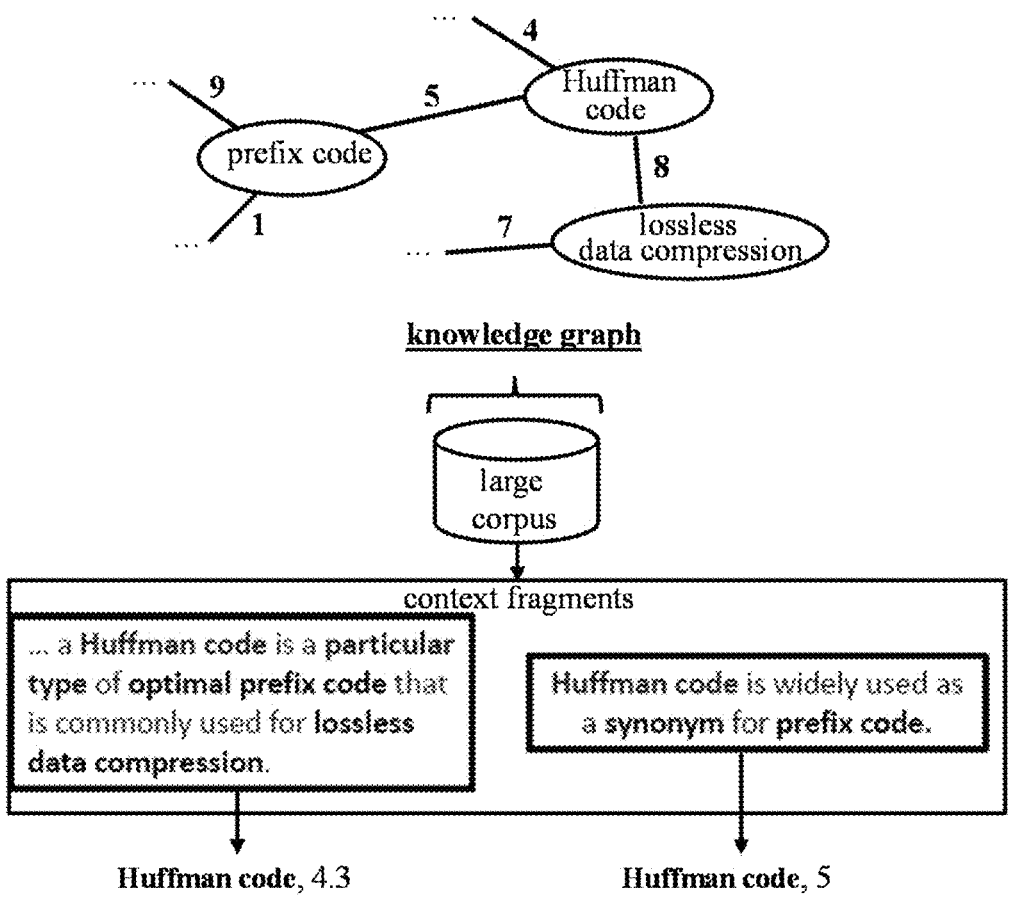

FIG. 11b shows another example using a knowledge graph. Text terms are represented in the graph by nodes interconnected by edges which are weighted according to the degree of semantic relationship between terms. Using context fragments as before, scores $s_i$ can be calculated for "Huffman code" in dependence on the weights associated with edges in the graph between the node representing "Huffman code" and nodes representing the other text terms in each fragment. For example, a score $s_i$ may be calculated as the average of these weights.

Further embodiments may leverage known frequency-based methods for computing values which can be used as initial specificity scores. These methods use statistical techniques involving frequency of occurrence of terms in a document corpus. TF-IDF (see "Relevance weighting of search terms", Robertson & Jones, Journal of the American Society for Information science, vol. 27, no. 3, pp. 129-146, 1976) and PMI (see "Word association norms, mutual information, and lexicography", Church & Hanks, Computational Linguistics, vol. 16, no. 1, pp. 22-29, 1990) are two commonly used frequency-based methods that can be used to extract signals, albeit noisy, for initial specificity scores. TF-IDF is a document-level metric indicating how important a word is to a document. Intuitively, a word with high specificity score should have high TF-IDF in documents belonging to the same domain, so this metric can be used as an initial specificity score when used with domain-specific corpora. The TF-IDF score can also be extracted for word n-grams and hence multiword expressions. PMI scores can be used to find related words. If two words have a high PMI score, then those words are likely to occur together often and may correspond to a well-defined concept. The PMI score can be computed by counting the number of appearances of each word, and the number of times the words are in the same word bi-grams. While both PMI and TF-IDF are metrics computed using corpus-level statistics, one can generate instance-level specificity scores using statistical information over a subset of a corpus. For PMI, one can sub-sample documents and compute scores over each sample. For TF-IDF, the formula can be computed for a given term and document in a corpus.

Various other text processing applications may be implemented by text processor 28. For example, specificity scores predicted by the CBR model can be used in processing various text data structures to extract data having a desired specificity. Use of the specificity scores can reduce the processing resources required to extract relevant data from various data structures for various purposes, and can improve quality of extracted data, thus enhancing performance of applications using these data structures. Some illustrative applications are described below with reference to FIGS. 12 through 15.

Figure 12:
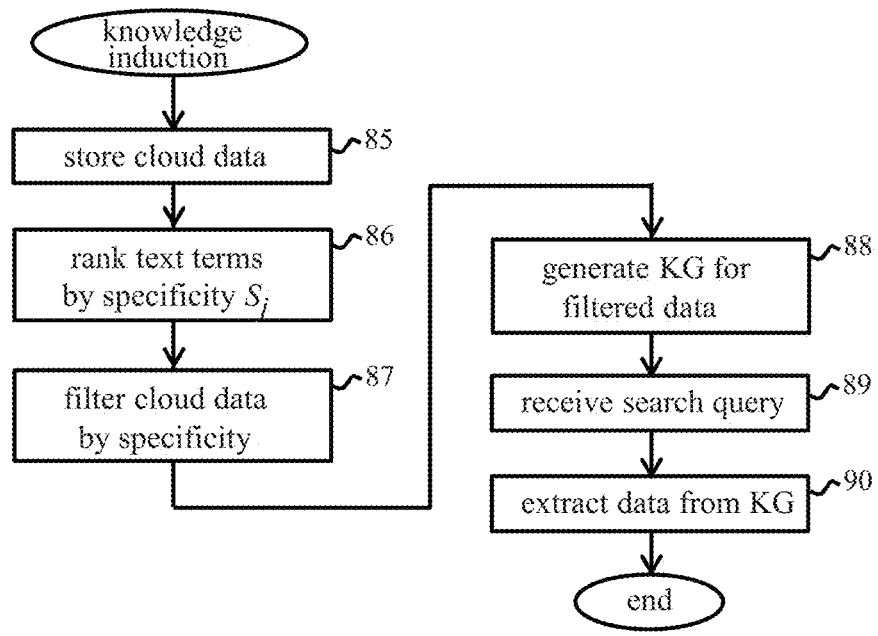
FIGS. 12 through 15 indicate operational steps of further text processing applications using methods embodying the invention.

FIG. 12 illustrates operation of a knowledge induction system for extracting knowledge from a large text corpus. Such systems commonly process huge volumes of text mined from databases/websites in the cloud. Step 85 represents storage of the cloud data to be analyzed. In step 86, the text processor 28 ranks text terms in this data by specificity score $S_j$. In step 87, the cloud data is filtered, based on the specificity scores, to identify a set of the most-specific text terms in the corpus, e.g., text terms with specificity scores greater than a defined threshold. In step 88, a knowledge graph (KG) is then constructed from the filtered data. This knowledge graph comprises nodes corresponding to terms in the identified set of most-specific text terms, interconnected by edges representing relations between those nodes. (Such relations can be defined in various ways for particular applications as will be apparent to those skilled in the art). The resulting knowledge graph provides a data structure which can be searched to extract information represented in the graph. In response to an input search query in step 89, the system then searches the graph in step 90 to extract requested data. Filtering the data used to construct the knowledge graph in this application can significantly reduce the size of the data structure, and hence memory required for storing the graph, while ensuring that the most specific data, which contains most information, is retained. The compute intensity of search operations is likewise reduced, and search results are focused on more specific, typically more useful, information.

Figure 13:
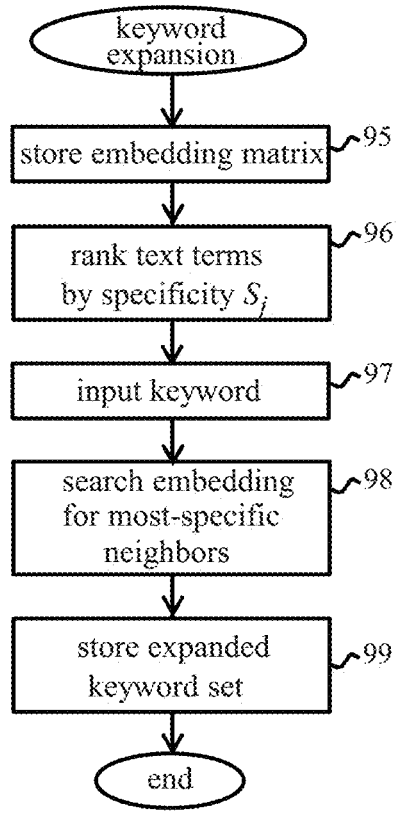

FIG. 13 illustrates a processing operation relating to expansion of keyword sets for search processes. Step 95 represents storage in the system of a word embedding matrix comprising vectors locating respective text terms in a latent embedding space. Such a matrix can be generated in similar manner to embedding matrix 67 of FIG. 5 and may encode a wide range of words/MWE in one or more technical fields. In step 96, the text terms in the embedding matrix are ranked by specificity score $S_j$. Step 97 represents input by a user of a keyword, represented by a vector in the embedding matrix, relating to a field to be searched. In step 98, the system then searches the embedding space around that keyword to identify neighboring text terms in the embedding space. Various clustering/nearest-neighbor search processes can be employed here, with the search process being adapted to locate a set of the most-specific text terms (e.g., terms with specificity scores above a desired threshold) neighboring the input keyword. In step 99, the text terms thus identified are stored, along with the user input keyword, as an expanded keyword set. This expanded keyword set can then be used to search a text corpus, e.g., by string matching keywords in the set to documents in the corpus, to identify relevant documents in the required field. Use of the specificity scores in this application allows small, user-input keyword sets to be automatically expanded with highly-specific related keywords, facilitating location of relevant documents in a given field. A particular example of this application is for collating training documents for training text classifier models.

Figure 14:
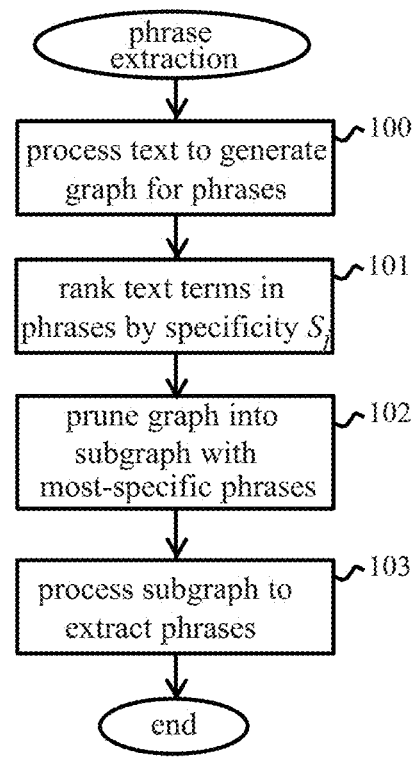

FIG. 14 illustrates an application for an automated phrase extraction system. Conventional phrase extraction systems can be used to extract theme phrases or key phrases from documents for abstraction/summarization purposes. These systems often use graph-based representations for candidate key phrases in documents. Nodes representing candidate phrases are interconnected by edges, representing relations between nodes, with associated weights (dependent on semantic similarity, frequency of occurrence, etc. . . . ) which are then used to select particular candidate phrases. Step 100 of FIG. 14 represents the usual text processing operation to generate a graph for candidate phrases. In step 101, text terms in the graph are ranked by specificity score $S_j$. In step 102, the graph is pruned based on specificity scores $S_j$ for text terms in the candidate phrases to obtain a subgraph representing a most-specific subset of these phrases. This subset may comprise phrases containing text terms with scores $S_j$ above a threshold. In step 103, the resulting subgraph is then processed in the usual way to extract particular candidate phrases from this subgraph. Such processing may involve scoring nodes based on various graph features to extract the particular candidate phrases for the desired purpose.

Figure 15:
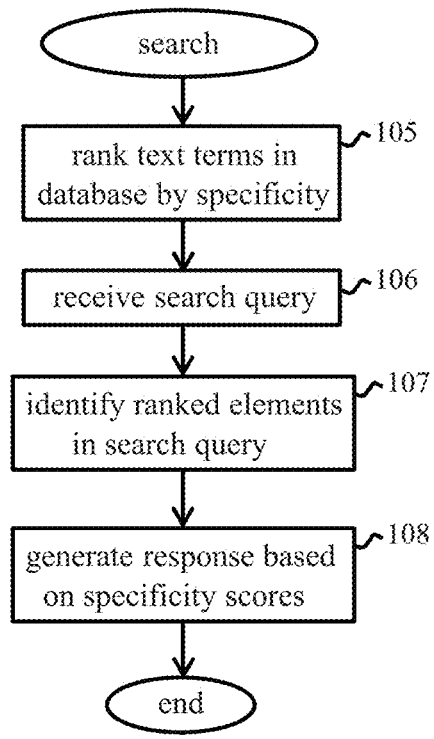

FIG. 15 illustrates an application in a search system. In step 105 here, text terms in a search database are ranked by specificity score $S_j$. In response to input of a search query in step 106, the system identifies any ranked text terms in the query text. In step 107, the system identifies the ranked text terms found in the query text and then ranks the text terms based on specificity scores. In step 108, the system generates a response to the search query by extracting data from the search database in dependence on the specificity scores for any ranked text terms so identified. The response here may be to suggest alternative search queries to the user, or to retrieve requested data from the search database. The specificity scores can be used to identify the most relevant alternative queries or response data based on terms with the highest specificity scores in the input query. The specificity scores may also be used to assess the degree of knowledge of the user and return results accordingly. For example, input queries containing highly specific text terms suggest a knowledgeable user wanting more detailed results, whereas low-specificity queries suggest a user needing more general, high-level results.

It will be seen that the embodiments described offer more efficient operation and improved results in various processing applications, and can reduce the memory and processing resources required for knowledge extraction operations.

Many other changes and modifications can be made to the exemplary embodiments described. For example, one or more dense layers 51 may be provided in CBR model 25, and dropout layers 56, 57, 60 may be omitted from the training architecture. Various other NN layer structures can be envisaged for the CBR model as will be apparent to those skilled in the art. Also, successive characters in the character string for a text term input to the model may comprise sub-word units of two or more successive letters. For example, tokenization layer 52 may implement a sub-word unit tokenization scheme such as BPE (Byte-Pair Encoding).

In the FIG. 5 system, the specificity calculator 65 may compute $s_i$ as a weighted average of the pairwise distances in the embedding space, with distance between a selected term and another term w being weighted by the inverse of the frequency of occurrence f=n/m of a term w appearing n times in a corpus of m words.

Various other embedding-based or frequency-based methods may be used to provide initial specificity scores for text terms. Scores might also be derived from click frequencies for selected terms in knowledge bases or other applications which allow users to click on links associated with text terms. Embodiments of the invention can leverage one or a combination of such methods to train robust character-based models from noisy metrics produced by these methods. The resulting CBR models can then provide accurate specificity predictions for previously unseen terms at a fraction of the computational cost of such methods, without keeping statistics for large vocabularies or accessing external knowledge sources or large pre-trained embeddings (which can be tens to hundreds of gigabytes in size).

Alternatives/modifications described in relation to one embodiment may be applied to other embodiments as appropriate. In general, where features are described herein with reference to a method embodying the invention, corresponding features may be provided in a computing system/computer program product embodying the invention, and vice versa.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
   storing a plurality of selected text terms from a corpus of text;
   determining an initial set of specificity scores for the plurality of selected text terms to produce a set of training samples, wherein each of the training samples comprise a selected text term and an initial specificity score for the selected text term, the initial specificity score calculated for the plurality of selected text terms depending upon distance in a word embedding space between the plurality of selected text terms and other text terms contained in a text fragment which include an instance of the selected text term;
   training a character-based regression model with the set of training samples;
   retrieving an Automated Term Extraction (ATE) training data set;
   determining specificity scores for text terms included in the ATE training data set;
   responsive to respective specificity score for a text term in the ATE training data set being below a threshold value, masking the text term from being used in the ATE training data set to generate a modified training set which is smaller than the ATE training data set but has a higher proportion of the selected text terms; and
   utilizing the modified training set in a knowledge discovery task, the modified training set reducing memory costs and processing resources required.

2. The computer-implemented method of claim 1, wherein the text terms included in the ATE training data set are ranked based on the evaluation of the terms by the character-based regression model.

3. The computer-implemented method of claim 1, wherein the character-based regression model evaluates text terms as a string of characters which comprise successive sub-word units of the text term.

4. The computer-implemented method of claim 1, wherein the initial set of specificity scores are calculated from the corpus of text via an automated text processing technique.

5. The computer-implemented method of claim 4, the computer-implemented method further comprising:
   determining the initial set of specificity scores for the selected text terms is further based on distance in a predetermined term embedding space between the selected text terms and other text terms in a text fragment of the corpus of text.

6. The computer-implemented method of claim 4, the computer-implemented method further comprising:
   determining the initial set of specificity scores for the selected text terms is further based on a frequency-based method using frequency of occurrence of that text term in at least a subset of said corpus.

7. The computer-implemented method of claim 1, the computer-implemented method further comprising:
   receiving a search query to a database; and
   generating a response to the search query by extracting data from the database in and determining specificity scores for any text terms identified in the search query.

8. A computer program product comprising:
   one or more computer-readable storage media and program instructions stored on the one or more computer-readable storage media, the program instructions comprising:
   program instructions to store a plurality of selected text terms from a corpus of text;
   program instructions to determine an initial set of specificity scores for the plurality of selected text terms to produce a set of training samples, wherein each of the training samples comprise a selected text term and an initial specificity score for the selected text term, the initial specificity score calculated for the plurality of selected text terms depending upon distance in a word embedding space between the plurality of selected text terms and other text terms contained in a text fragment which include an instance of the selected text term;
   program instructions to train a character-based regression model with the set of training samples;
   program instructions to retrieve an Automated Term Extraction (ATE) training data set;
   program instructions to determine specificity scores for text terms included in the ATE training data set;
   program instructions, responsive to respective specificity score for a text term in the ATE training data set being below a threshold value, to mask the text term from being used in the ATE training data set to generate a modified training set which is smaller than the ATE training data set but has a higher proportion of the selected text terms; and
   program instructions to utilize the modified training set in a knowledge discovery task, the modified training set reducing memory costs and processing resources required.

9. The computer program product of claim 8, wherein the text terms included in the ATE training data set are ranked based on the evaluation of the terms by the character-based regression model.

10. The computer program product of claim 8, wherein the character-based regression model evaluates text terms as a string of characters which comprise successive sub-word units of the text term.

11. The computer program product of claim 8, wherein the initial set of specificity scores are calculated from the corpus of text via an automated text processing technique.

12. The computer program product of claim 11, the program instructions further comprising:
   program instructions to determine the initial set of specificity scores for the selected text terms is further based on distance in a predetermined term embedding space between the selected text terms and other text terms in a text fragment of the corpus of text.

13. The computer program product of claim 11, the program instructions further comprising:
   program instructions to determine the initial set of specificity scores for the selected text terms is further based on a frequency-based method using frequency of occurrence of that text term in at least a subset of said corpus.

14. The computer program product of claim 8, the program instructions further comprising:
   program instructions to receive a search query to a database; and
   program instructions to generate a response to the search query by extracting data from the database in and determining specificity scores for any text terms identified in the search query.

15. A computer system comprising:
   one or more computer processors;
   one or more computer readable storage media; and
   program instructions stored on the computer readable storage media for execution by at least one of the one or more processors, the program instructions comprising:
   program instructions to store a plurality of selected text terms from a corpus of text;
   program instructions to determine an initial set of specificity scores for the plurality of selected text terms to produce a set of training samples, wherein each of the training samples comprise a selected text term and an initial specificity score for the selected text term, the initial specificity score calculated for the plurality of selected text terms depending upon distance in a word embedding space between the plurality of selected text terms and other text terms contained in a text fragment which include an instance of the selected text term;
   program instructions to train a character-based regression model with the set of training samples;
   program instructions to retrieve an Automated Term Extraction (ATE) training data set;
   program instructions to determine specificity scores for text terms included in the ATE training data set;
   program instructions, responsive to respective specificity score for a text term in the ATE training data set being below a threshold value, to mask the text term from being used in the ATE training data set to generate a modified training set which is smaller than the ATE training data set but has a higher proportion of the selected text terms; and
   program instructions to utilize the modified training set in a knowledge discovery task, the modified training set reducing memory costs and processing resources required.

16. The computer system of claim 15, wherein the text terms included in the ATE training data set are ranked based on the evaluation of the terms by the character-based regression model.

17. The computer system of claim 15, wherein the character-based regression model evaluates text terms as a string of characters which comprise successive sub-word units of the text term.

18. The computer system of claim 15, wherein the initial set of specificity scores are calculated from the corpus of text via an automated text processing technique.

19. The computer system of claim 18, the program instructions further comprising:
   program instructions to determine the initial set of specificity scores for the selected text terms is further based on distance in a predetermined term embedding space between the selected text terms and other text terms in a text fragment of the corpus of text.

20. The computer system of claim 18, the program instructions further comprising:
   program instructions to determine the initial set of specificity scores for the selected text terms is further based on a frequency-based method using frequency of occurrence of that text term in at least a subset of said corpus.

* * * * *